United States Patent [19]

Iwata

[11] Patent Number: 5,485,366
[45] Date of Patent: Jan. 16, 1996

[54] SEQUENCE CONTROLLER INCLUDING ERROR CORRECTION AND METHOD THEREFOR

[75] Inventor: Yasunobu Iwata, Aichi, Japan

[73] Assignee: Mitsubishi Denki Kabushiki Kaisha, Tokyo, Japan

[21] Appl. No.: 2,027

[22] Filed: Jan. 8, 1993

[30] Foreign Application Priority Data

Jan. 10, 1992 [JP] Japan .................... 4-003229

[51] Int. Cl.$^6$ ................................. G05B 11/01
[52] U.S. Cl. .................. 364/140; 364/183; 364/184
[58] Field of Search ........................ 364/183–187, 364/140, 141, 265, 265.5, 265.6, 266.5; 371/7, 12, 14; 395/275, 575

[56] References Cited

U.S. PATENT DOCUMENTS

| | | | |
|---|---|---|---|
| 4,363,092 | 12/1982 | Abo et al. ...................... | 364/200 |
| 4,638,227 | 1/1987 | Katayama et al. ............ | 364/184 |
| 4,930,128 | 5/1990 | Suzuki et al. ................. | 371/12 |
| 4,992,928 | 2/1991 | Ishihara et al. ............... | 364/184 |

FOREIGN PATENT DOCUMENTS

| | | |
|---|---|---|
| 0208997 | 1/1987 | European Pat. Off. . |
| 0435139 | 3/1991 | European Pat. Off. . |
| 0416512 | 3/1991 | European Pat. Off. . |
| 0458132 | 11/1991 | European Pat. Off. . |
| 2178809 | 7/1990 | Japan . |
| 2233128 | 4/1990 | United Kingdom . |
| 2233128A | 1/1991 | United Kingdom . |

OTHER PUBLICATIONS

Patent Abstracts of Japan, vol. 9, No. 249 (M–419), Oct. 5, 1985 & JP-A-60 099 545, (Mitsubishi Jukogyo K.K.), Jun. 3, 1985, Abstract.
Patent Abstracts of Japan, vol. 10, No. 64 (P–436), Mar. 14, 1986 & JP-A-60 205 639, (Nippon Denki K.K.), Oct. 17, 1985, Abstract.

*Primary Examiner*—James P. Trammell
*Attorney, Agent, or Firm*—Sughrue, Mion, Zinn, Macpeak & Seas

[57] ABSTRACT

A sequence controller with error correction and a sequence controlling method are disclosed. The sequence controller is provided with a stop-time operation execution table, which stores stop-time execution step numbers and resumption-time execution step numbers. These step numbers correspond to step numbers at which a stop is expected to occur in a sequence control program for sequence-controlling a controlled object. According to the sequence controlling method, the execution of the sequence control program is stopped at the occurrence of an error, the stop-time execution step number corresponding to the stop-time step number is read from the stop-time operation execution table, a step having the step number read is executed, the resumption-time execution step number is read, and the execution is resumed from that step. As a result, error processing can be performed by only specifying a step number, the error processing need not be described in the program, and programs can be written, revised and reviewed easily.

2 Claims, 9 Drawing Sheets

[STOP-TIME EXECUTION OPERATION TABLE] 35

| E1<br>STOP-TIME<br>STEP NUMBER | E2<br>STOP-TIME<br>EXECUTION<br>STEP NUMBER | E3<br>RESUMPTION-TIME<br>EXECUTION<br>STEP NUMBER |
|---|---|---|
| 1 | 4 | 1 |
| 2 | 4 | 2 |
|   | 1 |   |
| 3 | 4 | 3 |
|   | 1 |   |

```
S0~□0
T0~0+
  S1~□①CLAMP
T1~1+              T2~2+                           7+~T7
  S2~□②MOTOR A OPERATED    □③MOTOR B OPERATED     □7~S7
T3~3+              T4~4+ ~S3                       8+~T8
                                                   ↳ J1
  S4~□④UNCLAMP                                    JUMP 1
T5~5+
  S5~□5
T6~6+
  = ~END
```

FIG. 10 PRIOR ART

[PROCESS SEQUENCE OPERATION TABLE] 31

| A1<br>EXECUTED STEP<br>NUMBER | A2<br>TRANSITION<br>CONDITION NUMBER | A3<br>NEXT EXECUTED<br>STEP NUMBER |
|---|---|---|
| 0 | 0 | 1 |
| 1 | 1 | 2 |
| 1 | 2 | 3 |
| * 1 | 7 | 7 |
| * 7 | 8 | 1 |
| 2 | 3 | 4 |
| 3 | 4 | 4 |
| 4 | 5 | 5 |
| 5 | 6 | END |

[CURRENTLY EXECUTED STEP NUMBER STORAGE TABLE]

| 0 | ~32
|---|

FIG. 11  PRIOR ART

[STEP OPERATION PROGRAM TABLE] 33

| C1 STEP NUMBER | C2 PROGRAM | C3 OPERATION |
|---|---|---|
| 0 | OUT Y0 | WORKPIECE LOAD |
| 1 | OUT Y1 | WORKPIECE CLAMP |
| 2 | OUT Y20 | MOTOR A OPERATION |
| 3 | OUT Y21 | MOTOR B OPERATION |
| 4 | OUT Y11 | WORKPIECE UNCLAMP |
| 5 | OUT Y12 | WORKPIECE UNLOAD |
| * 7 | OUT Y11 | WORKPIECE UNCLAMP |

[TRANSITION CONDITION PROGRAM TABLE] 34

| D1 TRANSITION CONDITION NUMBER | D2 PROGRAM | D3 TRANSITION CONDITION |
|---|---|---|
| 0 | LD X0 | WORKPIECE LOAD COMPLETE |
| 1 | (LD LS1)*(LD L1)*(LD L2) | WORKPIECE A CLAMP COMPLETE, NORMAL POSITION |
| 2 | (LD LS2)*(LD L1)*(LD L2) | WORKPIECE B CLAMP COMPLETE, NORMAL POSITION |
| 3 | LD X20 | MOTOR A OPERATION COMPLETE |
| 4 | LD X21 | MOTOR B OPERATION COMPLETE |
| 5 | LD X11 | WORKPIECE UNCLAMP COMPLETE |
| 6 | LD X12 | WORKPIECE UNLOAD COMPLETE |
| * 7 | (NOT T1)*(NOT T2) | NEITHER T1 NOR T2 IS ENABLED |
| * 8 | (LD X11)*(LD PB1) | WORKPIECE UNCLAMP COMPLETE, RESTART BUTTON ON |

FIG. 12  PRIOR ART 5,485,366

SEQUENCE CONTROLLER INCLUDING ERROR CORRECTION AND METHOD THEREFOR

BACKGROUND OF THE INVENTION

1. Field of the Invention

The present invention relates to a sequence controller which exercises sequence control of a controlled object.

2. Description of the Relevant Art

Sequence controllers for sequence-controlling a controlled object in accordance with a pre-written sequence program are often employed in applications wherein a controlled object is sequence-controlled. SFC (Sequential Function Chart) programs, which will be described later, are frequently used as sequence programs.

Figure 7:
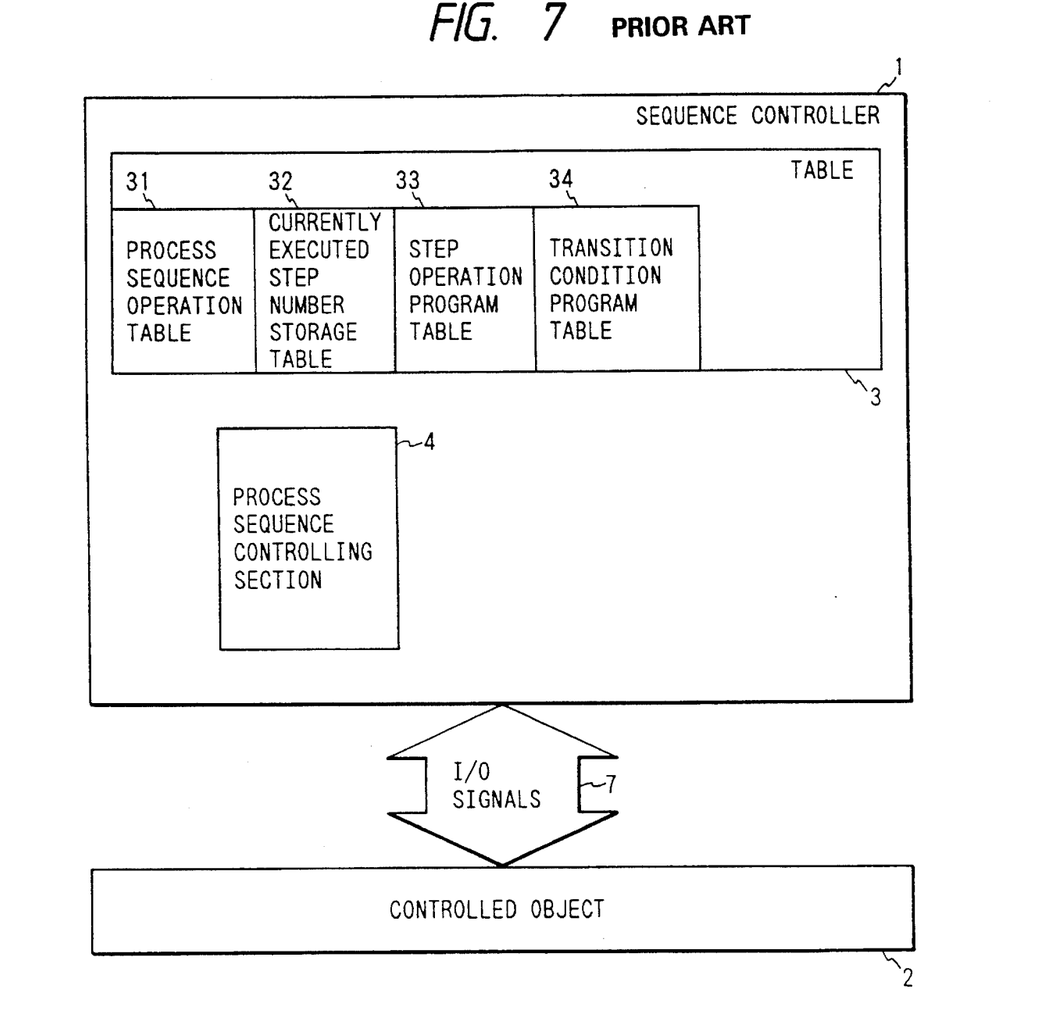
FIG. 7 illustrates the arrangement of a conventional sequence controller.

FIG. 7 is a block diagram illustrating the arrangement of a conventional sequence controller using an SFC program as a sequence program, wherein the numeral 1 indicates a sequence controller, and 2 a controlled object. Reference numeral 3 indicates a table comprising a process sequence operation table 31, a currently executed step number storage table 32, a step operation program storage table 33 and a transition condition program storage table 34 which will be described later. A process sequence controlling section 4 acts as a process sequence controller. Numeral 7 indicates input and output signals to and from the sequence controller 1. The sequence controller 1 comprises a CPU, a memory and an I/O interface, etc. (not separately shown), on a hardware basis. The process sequence controlling section 4, serving as a process sequence controller, implements functions which are generated when the CPU executes a process sequence control program (an SFC program executing program) stored in the memory. The table 3 and other data such as the sequence program are stored in the memory.

Figure 8:
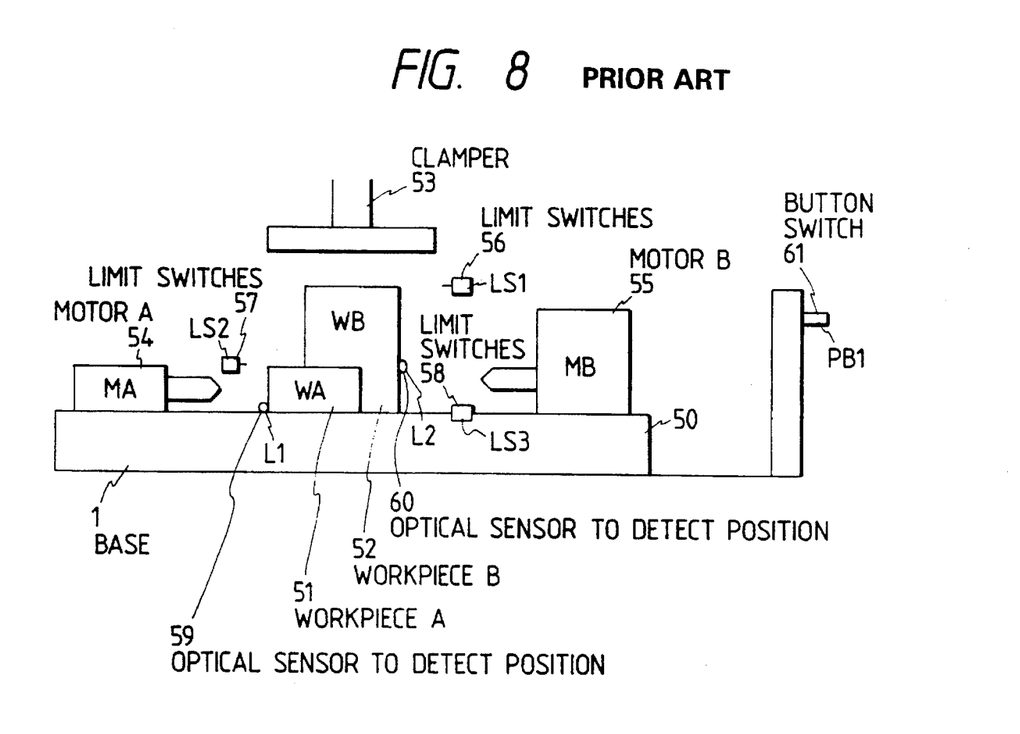
FIG. 8 illustrates an example of a controlled object controlled by the sequence controller shown in FIG. 1 or 7.

FIG. 8 illustrates an example of a controlled object 2 controlled by the sequence controller 1, wherein 50 indicates a base, 51 and 52 a workpiece A and a workpiece B, respectively, 53 a clamper for the workpiece A 51 or the workpiece B 52, and 54 and 55 a drive motor A and a drive motor B, respectively, provided with machining means for machining the workpiece A 51 or the workpiece B 52. Reference numerals 56–58 indicate limit switches which normally remain OFF (hereinafter referred to as LS1, LS2, LS3, respectively). LS1 56 is turned ON by clamper 53 when workpiece B is set. LS2 57 is turned ON by clamper 53 when workpiece A is set and LS3 58 is turned ON by clamper 53 when workpieces are not set. Reference numbers 59 and 60 designate position detection optical sensors (hereinafter referred to as L1 and L2 respectively) to detect how far the workpieces A 51 and B 52 are shifted from their correct positions, respectively. By receiving the light from an optical (light) source (not illustrated), provided separately, L1 59 will be turned ON when workpiece A 51 is set in the right position but remains turned OFF if it is set off the mark. L2 60 is turned ON when workpiece B 52 is placed in the right position, but remains turned OFF if it is placed in an incorrect position. Numeral 61 indicates a restart button switch (hereinafter referred to as PB).

Figure 9:
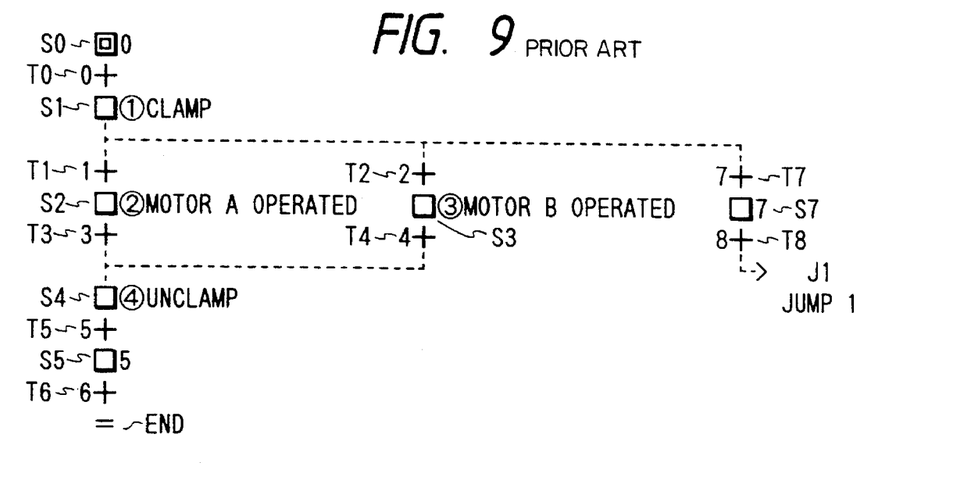
FIG. 9 illustrates an example of an SFC program (process sequence operation program) for the sequence controller shown in FIG. 7.

FIG. 9 illustrates an SFC program example of a sequence program 3 when the controlled object shown in FIG. 8 is controlled by the sequence controller 1. Referring to FIG. 9, S0 indicates a step number of an initial step representing the start of the SFC program; S1 to S7, step numbers of operation steps representing specific control operations; T1 to T8, numbers of transition conditions from one operation step to the next, and J1 a jump destination number for a jump operation. END indicates an END step representing the end of the SFC program.

The operation of the controlled object shown in FIG. 8 will now be described in accordance with the SFC program illustrated in FIG. 9. Control is initiated at the initial step S0 in the SFC program shown in FIG. 9 and the workpiece A 51 is loaded and set in a predetermined position on the base 50. After it is confirmed that the workpiece A 51 has been set at the transition condition T0, the workpiece A 51 is clamped by the clamper 53 at the step S1. After it is confirmed that clamping of workpiece A 51 is completed and that LS2 57, L1 59, and L2 60 are turned ON, confirming that the workpiece is set in a predetermined position at the transition condition T1, the drive motor A 54 is operated at the step S2 to machine the workpiece A 51. After it is confirmed that the workpiece A 51 has been machined at the transition condition T3, the clamper 53 is operated to unclamp the workpiece A 51 at the step S4. After it is confirmed that the workpiece A 51 has been unclamped at the transition condition T5, the workpiece A 51 is unloaded from the base 50 at the step S5. After it is confirmed that the workpiece A 51 has been unloaded at the transition condition T6, this SFC program is terminated at the END step.

When the workpiece B 52 is loaded, the transition condition T2 is enabled in place of the transition condition T1, it is then confirmed that the workpiece B 52 has been clamped, and the drive motor B 55 is operated to machine the workpiece B 52 at the step S3.

Figure 10:
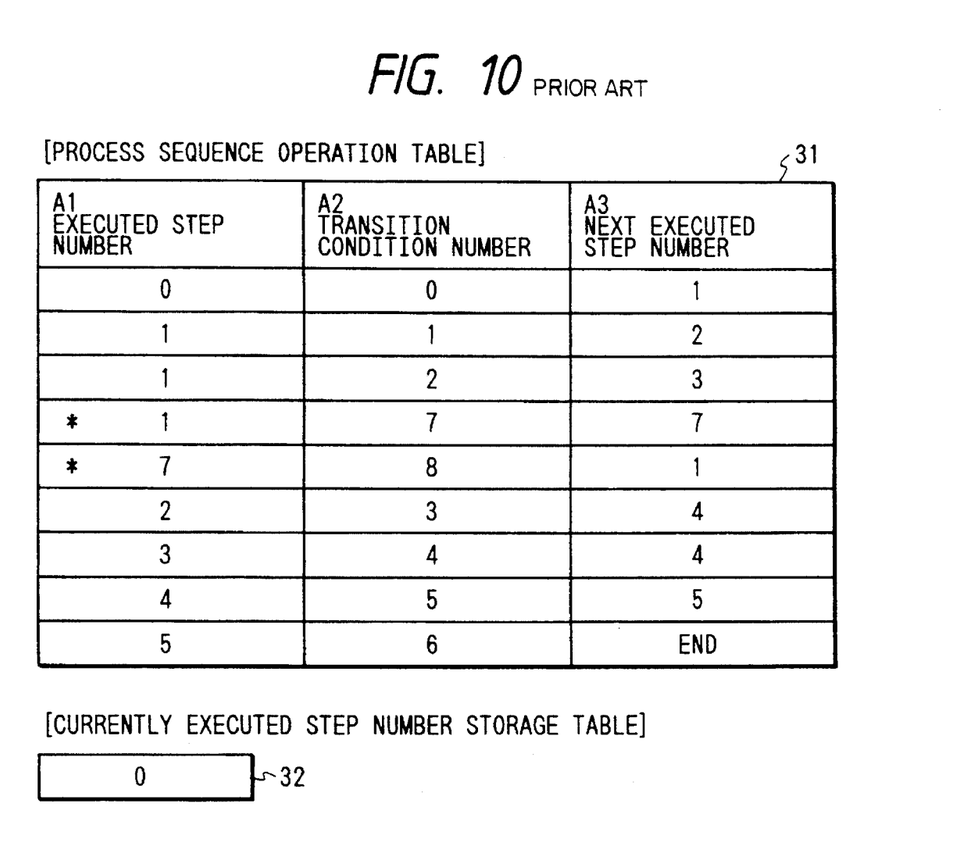
FIG. 10 illustrates a process sequence operation table and a currently executed step number storage table as internal tables of the sequence controller shown in FIG. 1 or 7.

FIG. 10 shows the arrangement of the process sequence operation table 31 and the currently executed step number storage table 32, which contains the currently executed step number, in the table 3 shown in FIG. 7.

Figure 11:
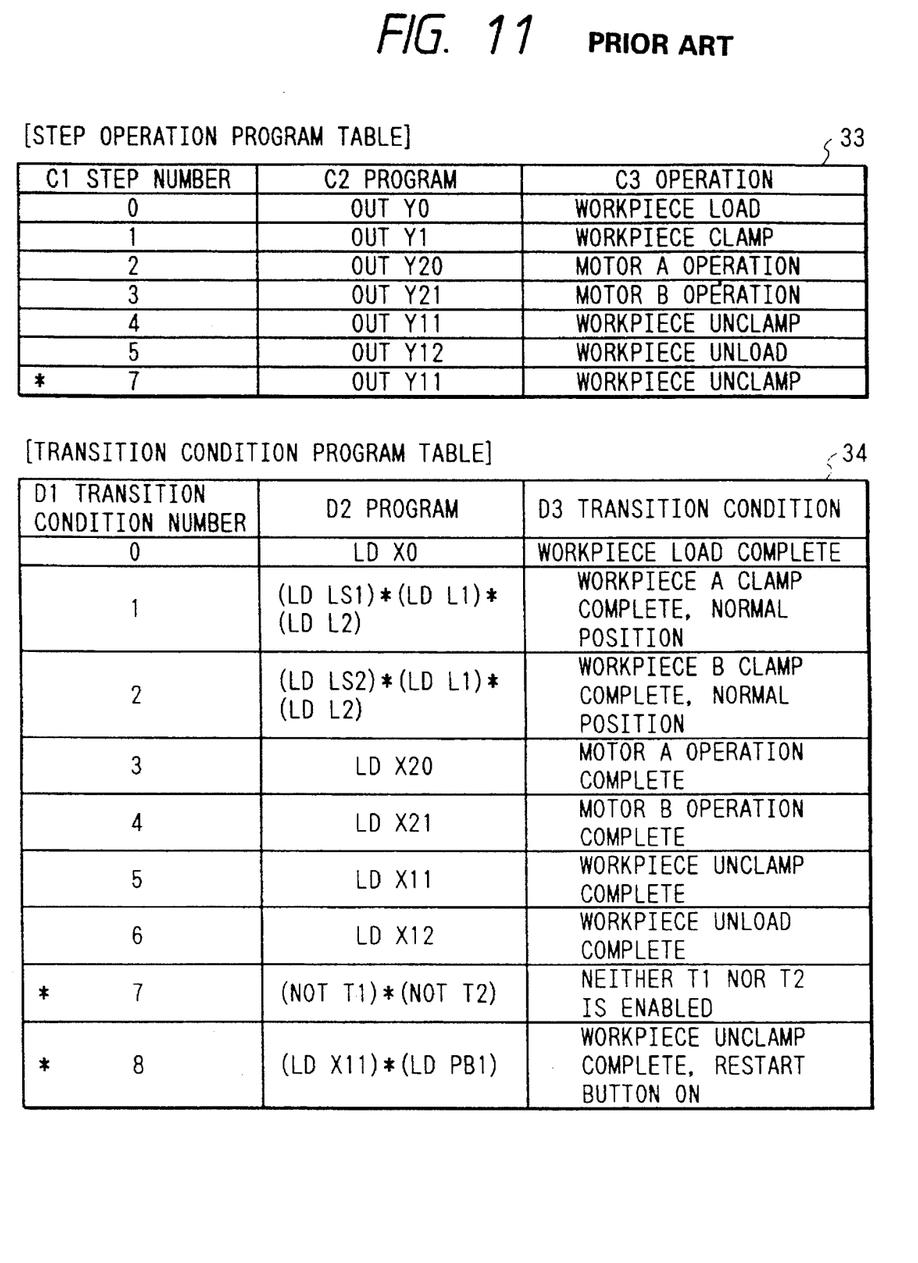
FIG. 11 illustrates a step operation program table and a transition condition program table as internal tables of the sequence controller shown in FIG. 1 or 7.

FIG. 11 shows the arrangement of the step operation program table 33, which indicates tabulated information on step operation programs, and the transition condition program table 34, which indicates tabulated information on transition condition programs, in the table 3. The SFC program is developed in the tables 31, 33 and 34 and retained within the sequence controller 1.

The process sequence operation table 31 (FIG. 10) indicates a tabulated process sequence program from which the sequence controller 1 reads the sequence of control operations performed in accordance with the SFC program shown in FIG. 9. The currently executed step number storage table 32 (FIG. 10) is employed by the sequence controller 1 to store the currently executed step number. The step operation program table 33 (FIG. 11) indicates tabulated information on step operation programs for operation instructions corresponding to the step numbers in the process sequence indicated in the process sequence operation table 31. Finally, the transition condition program table 34 (FIG. 11) indicates tabulated information on transition condition programs acting as transition conditions to subsequent steps corresponding to the process sequence numbers indicated in the process sequence operation table 31.

Figure 12:
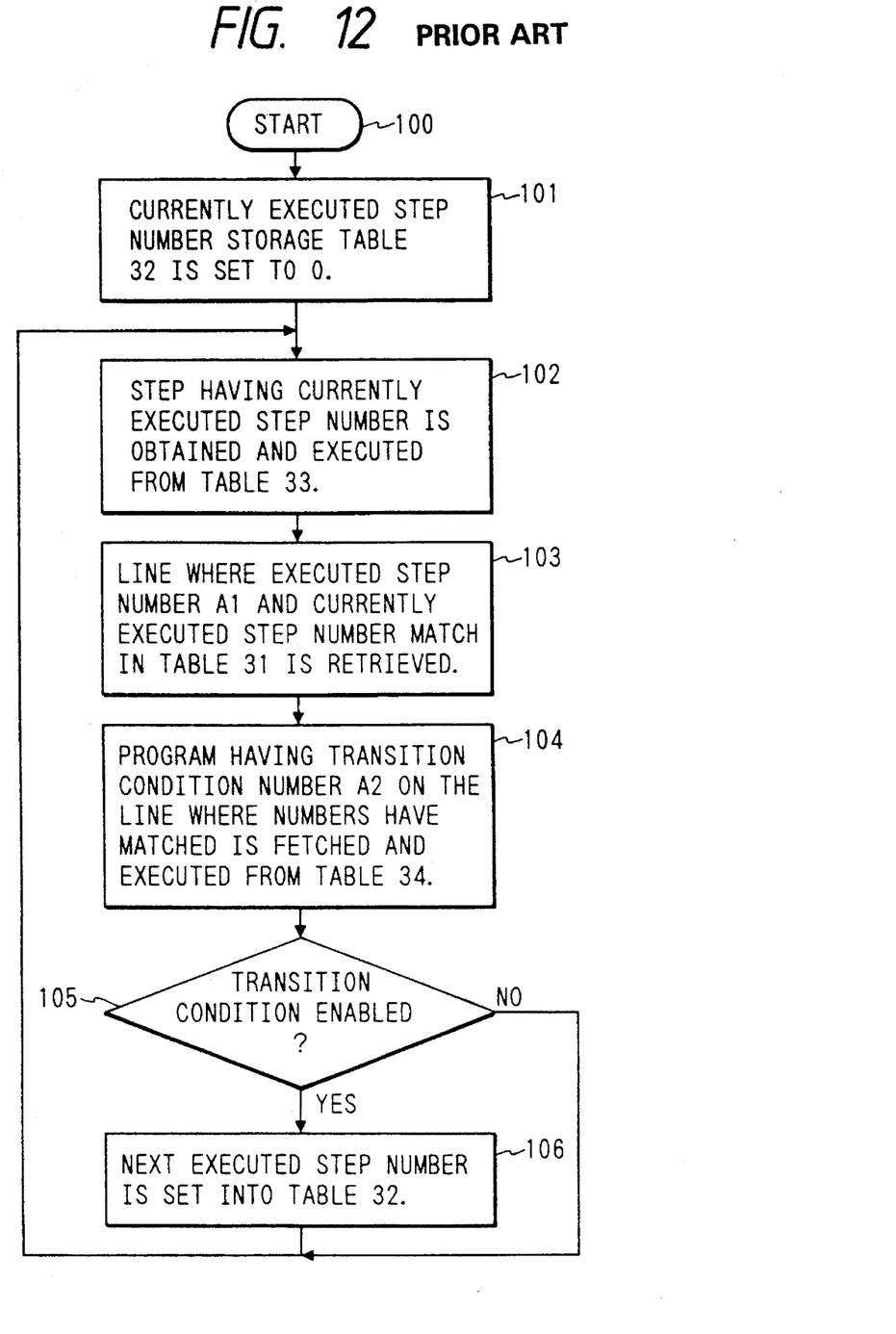
FIG. 12 illustrates the processing sequence of a process sequence controlling section in the sequence controller shown in FIG. 7.

FIG. 12 is a flowchart for a processing sequence in the process sequence controlling section 4 shown in FIG. 7. The processing sequence for executing the SFC program illustrated in FIG. 9 will now be described with reference to FIG. 12.

In the flowchart shown in FIG. 12, when the process sequence controlling section 4 is activated at step 100, a step number stored in the currently executed step number storage table 32, i.e., the currently executed step number, is set to 0 at step 101. Then, at step 102, the step number C1 stored in the table 32 is read and the step operation program C3 corresponding to that step number is fetched and executed from the step operation program table 33. Further, at step 103, a line on which the executed step number A1 matches the currently executed step number stored in the table 32 is retrieved from the process sequence operation table 31 in order to obtain a next operated step number, and at step 104, the transition condition number A2 on the line where the above step numbers have matched is obtained and the transition condition program D2 corresponding to that number is fetched and executed from the transition condition program table 34.

Then, at step 105, it is checked to see if the transition condition has been enabled. If it has been enabled, the next executed step number is obtained from the next executed step number A3 in the process sequence operation table 31 and stored into the table 32 at step 106, and the processing returns to step 102. If the transition condition has not been enabled at step 105, the processing returns to step 102.

An error occurring at step S1 in the SFC program shown in FIG. 9 will now be described. If an error has taken place at step S1, neither of the transition conditions T1 or T2 is enabled, and the operation stops progressing. To avoid this, error processing is provided in the process sequence program itself. That is, as shown in the arm containing the transition condition T7 through the jump J1 in FIG. 9, a clamp error is checked at the transition condition T7, the workpiece A 51 or workpiece B 52 is unclamped and the cause of the fault is eliminated at the step S7. Then it is confirmed at the transition condition T8 that the fault cause has been removed, the execution thereafter jumps to the step S1 at the jump J1, such that the operation, from step 1 and onward, is repeated. This error processing is marked * in the process sequence operation table 31 in FIG. 10. In case neither the transition condition T1 nor T2 is enabled, that is, when the workpiece has not been set and LS3 58 has been turned ON by the clamper 53, or when either L1 59 or L2 60 has been turned OFF due to an incorrect positioning of either workpiece A 51 or B 52 or when none of the limit switches LS1 56, LS2 57 or LS3 58 has been turned ON even after a pre-determined length of time due, e.g., to a fault of clamper 53 itself, the transition condition of T7 is enabled. Confirmation of the removal of the cause of the fault in the transition condition 78 is made by an operator. The operation restarts with clamping at step 1 after the operator actuates PB 61.

Because the conventional sequence controller is arranged as described above, processing at the occurrence of an error while the sequence program is operational must be described and provided beforehand in the process sequence program itself, so that it can first be determined whether the operation is normal or faulty, and so that, if an error has taken place, the predetermined processing can be performed. It requires much time and labor to write such a program, however, and this increases the size of the overall program.

SUMMARY OF THE INVENTION

It is accordingly an object of the present invention to overcome the disadvantages of such a conventional system by providing a sequence controller and a sequence controlling method therefore which make it easy to write programs.

According to the invention, a sequence controller is provided with a stop-time operation execution table, which stores stop-time execution step numbers and resumption-time execution step numbers corresponding to step numbers at which a stop is expected to occur in a sequence control program for sequence-controlling a controlled object, so that the execution of the sequence control program may be stopped at the occurrence of an error, the stop-time execution step number corresponding to the stop-time step number then being read from the stop-time operation execution table, a step having the step number read then being executed. Further, the resumption-time execution step number is read and the execution is resumed from that step, whereby error processing can be performed by only specifying a step number, error processing need not be described in the program, and programs can be described easily.

DESCRIPTION OF THE PREFERRED EMBODIMENTS

A first and a second embodiment of the invention will be described with reference to FIGS. 1 to 6, 8, 10 and 11, wherein reference characters identical to those recited previously indicate parts identical or corresponding to those in the described sequence controller.

Figure 1:
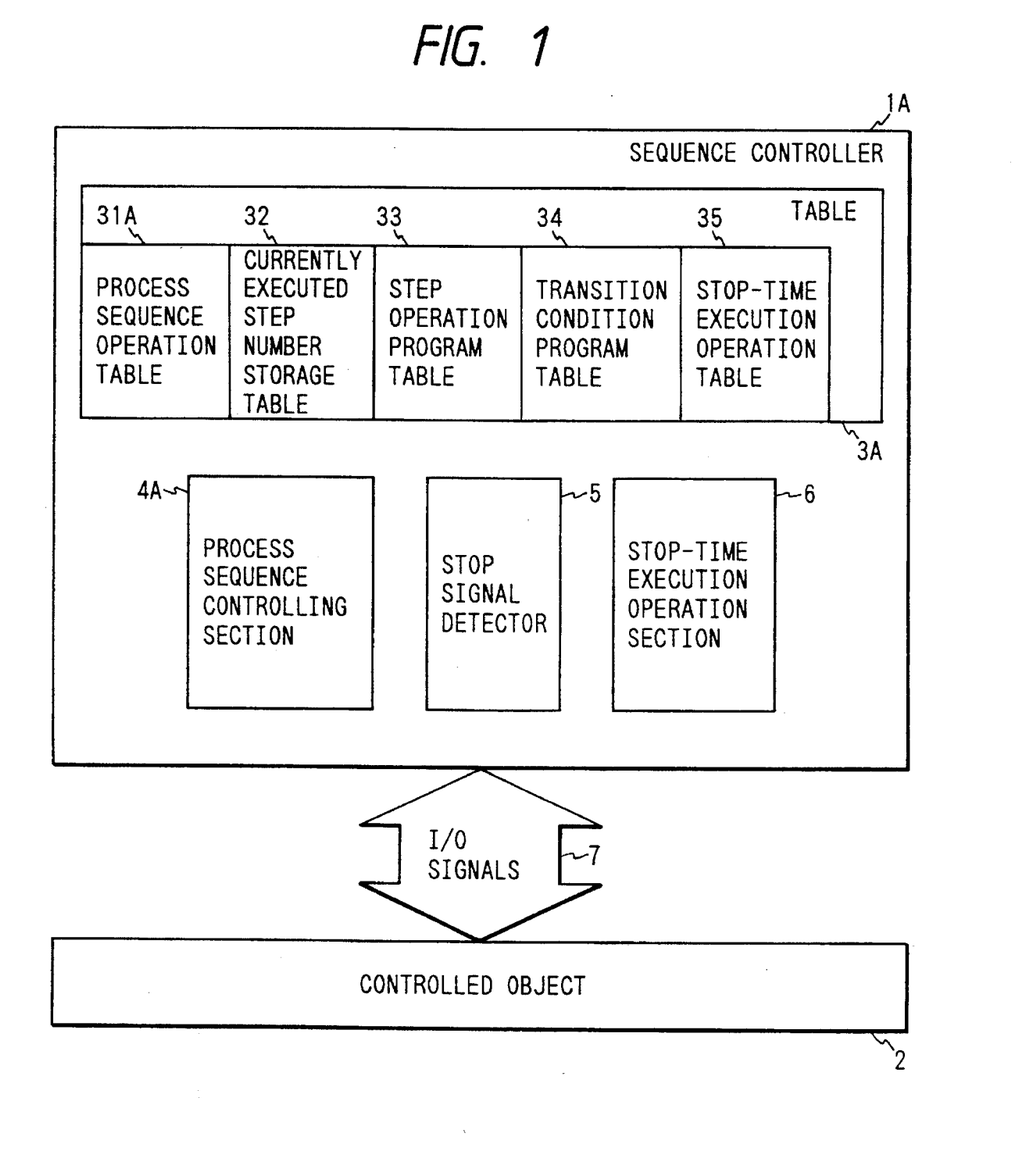
FIG. 1 illustrates the arrangement of a sequence controller in a first and second embodiment of the invention.

FIG. 1 shows the arrangement of a sequence controller exhibiting a first embodiment of the invention and a second embodiment of the invention. In FIG. 1, the numeral 1A indicates a sequence controller, and 3A a table consisting of the conventional table 3 shown in FIG. 7 and an additional stop-time execution operation table 35 which will be described later. Reference numeral 5 indicates a stop signal detector acting as an input signal change detecting means for detecting the presence or absence of an input signal change in each process, and 6 a stop-time execution operation section serving as a stop-time operation executer for stopping sequence control on the basis of the input signal change, executing a stop-time operation, and resuming sequence control from the process point where the change was detected, when the input signal change has been restored to the previous state.

Figure 2:
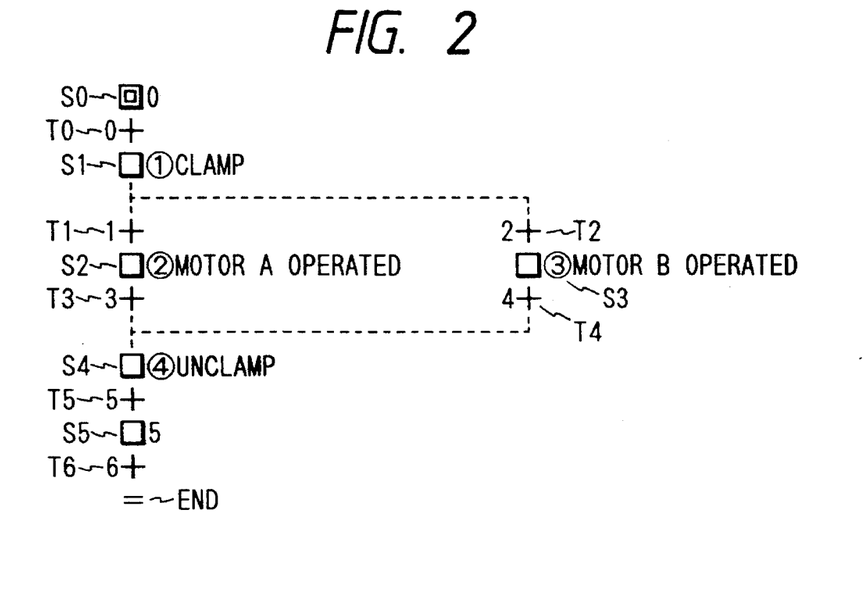
FIG. 2 illustrates an example of an SFC program (process sequence operation program) for the sequence controller shown in FIG. 1.

FIG. 2 illustrates the sequence program 3 in the form of an SFC (Sequential Function Chart) employed when the controlled object 2 shown in FIG. 8 is controlled by the sequence controller 1. As compared to the SFC program shown in FIG. 9, fault-time operations have been omitted. Namely, the SFC program in FIG. 2 is identical to the one in FIG. 9 with the exception that the transition condition T7, the step S7, the transition condition T8 and the jump J1 are not required.

Figure 3:
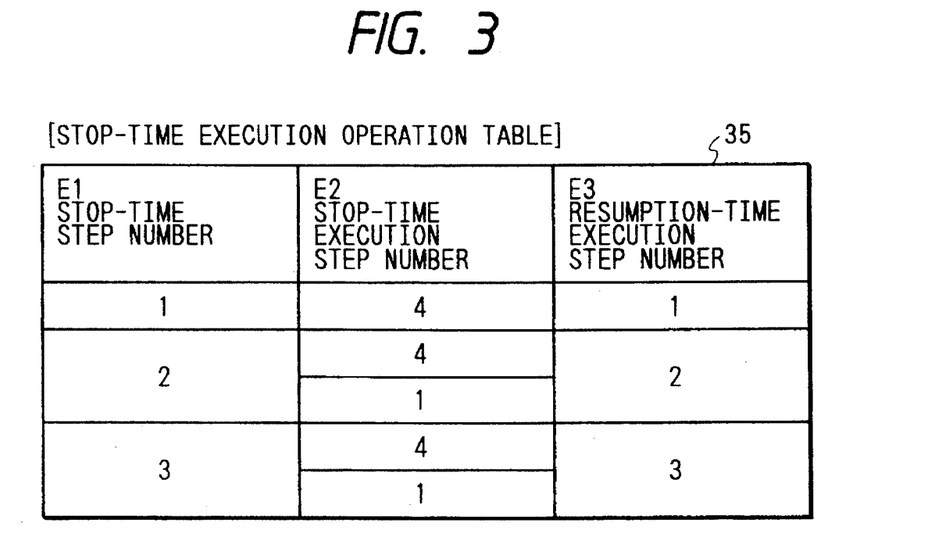
FIG. 3 illustrates a stop-time execution operation table as an internal table of the sequence controller shown in FIG. 1.

FIG. 3 shows the arrangement of the stop-time execution operation table 35 which is part of the table 3A. The table 35 comprises a step number E1 at which a stop is expected to occur in the SFC control program for sequence-controlling the controlled object, a step number E2 which is executed when a stop is effected at the step number E1, and a step number E3 which is executed at a resumption time.

A process sequence operation table 31A in the table 3A does not include the lines marked *, i.e., the error-time execution steps, in the table 31 shown in FIG. 10. The stop-time execution operation table 35 shown in FIG. 3 is provided instead of the lines marked *.

Figure 4:
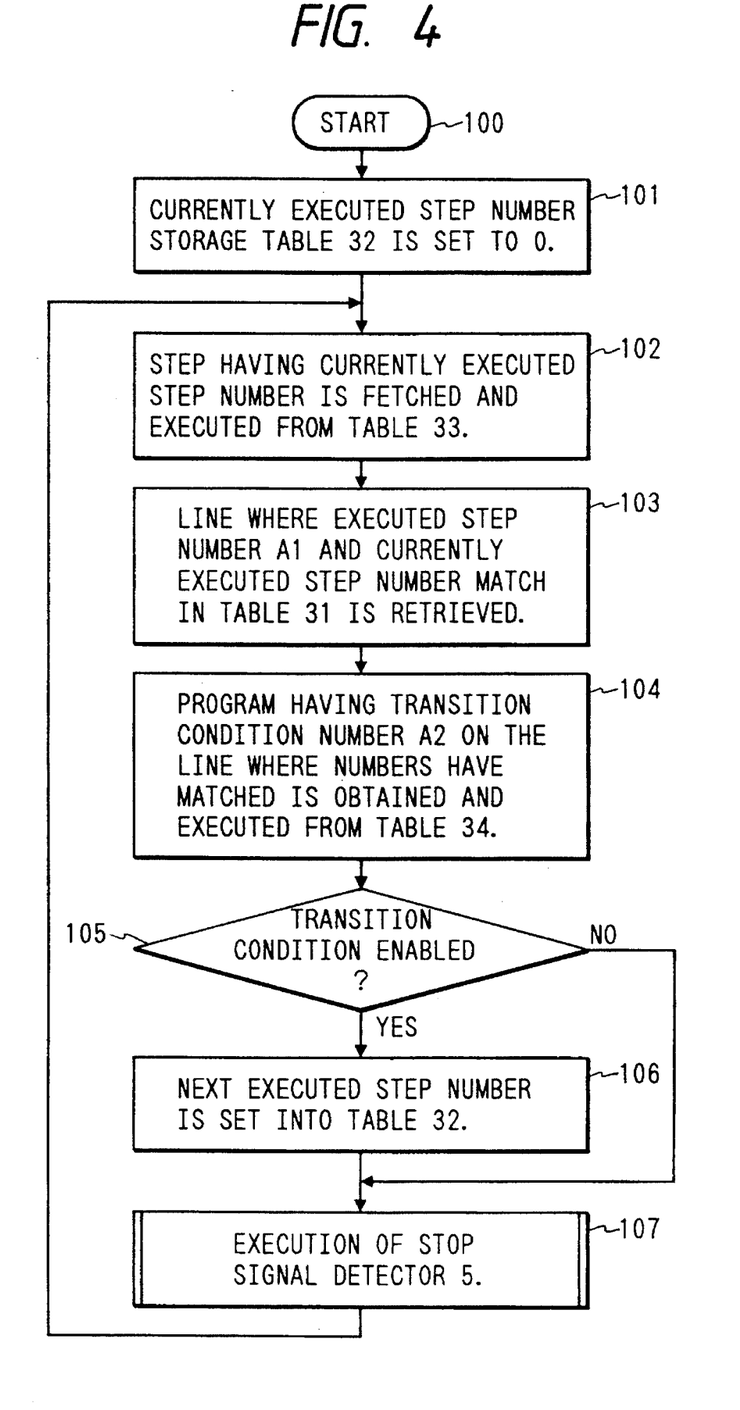
FIG. 4 illustrates the processing sequence of a process sequence controlling section in the sequence controller shown in FIG. 1.
Figure 5:
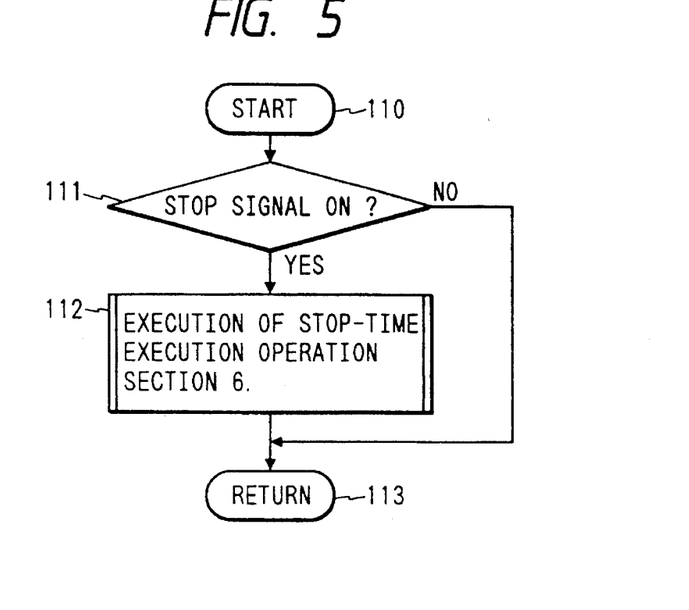
FIG. 5 illustrates the processing sequence of a stop signal detector in the sequence controller shown in FIG. 1.
Figure 6:
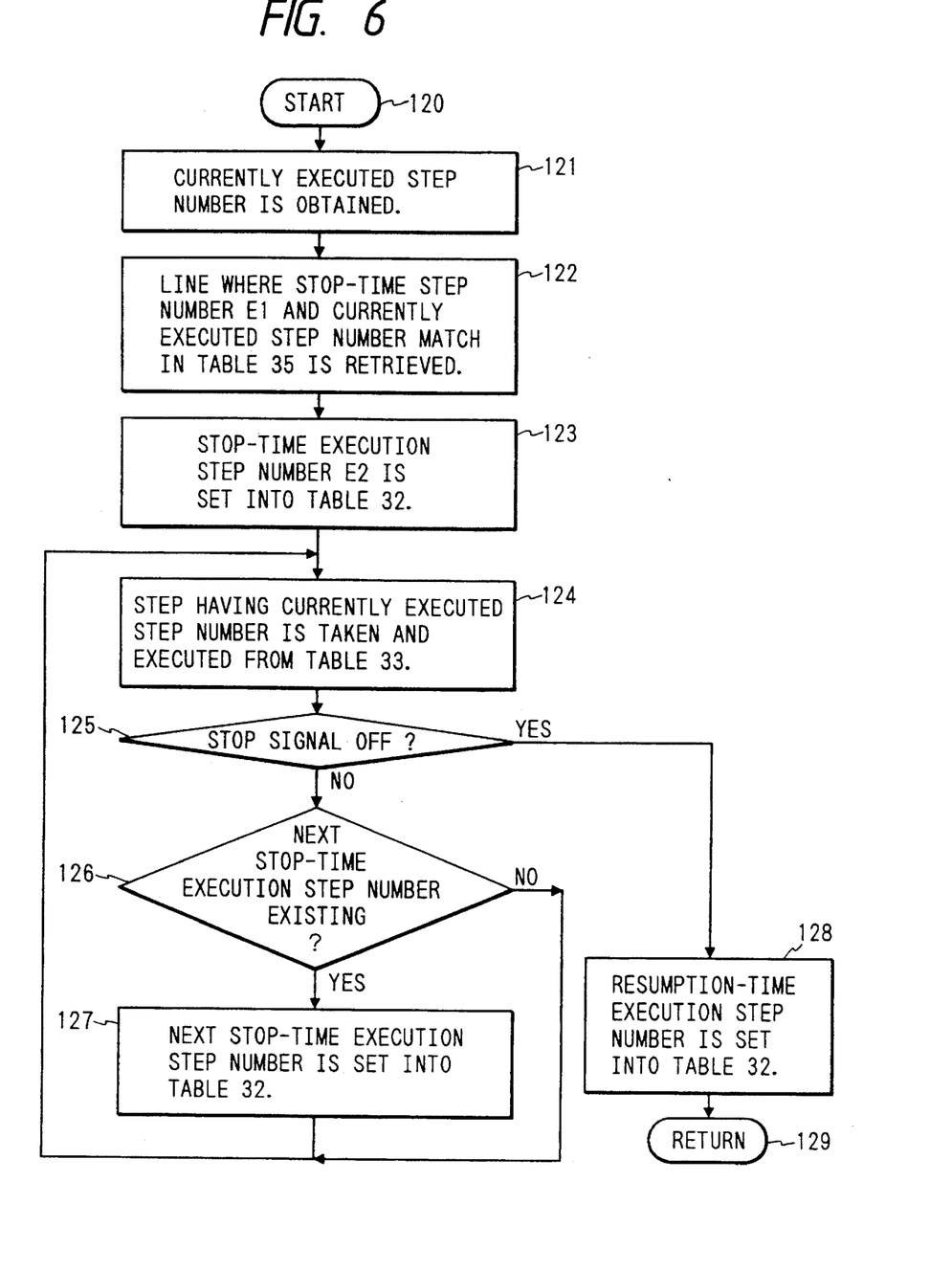
FIG. 6 illustrates the processing sequence of a stop-time execution operation section in the sequence controller shown in FIG. 1.

FIG. 4 is a processing flowchart for a process sequence controlling section 4A, FIG. 5 a processing flowchart for the stop signal detector 5, and FIG. 6 a processing flowchart for the stop-time execution operation section 6. When activated, the process sequence controlling section 4A executes the steps indicated in the executed step number A1 in sequence in accordance with the process sequence operation table 31A. At this time, when a stop signal is detected by the stop signal detector 5, the stop-time execution operation section 6 is activated and executes a step having the stop-time step number set in the stop-time execution operation table 35. When the stop signal is then turned off, execution is resumed from the resumption-time execution step number E3 in the table 35.

The details of this processing will now be described in accordance with the flowcharts shown in FIGS. 4 to 6. Referring to the flowchart shown in FIG. 4, when the process sequence controlling section 4A is activated at step 100, the currently executed step number storage table 32 is set to zero at step 101. Hereafter, the processing up to step 106 is identical to that in the flowchart described with reference to FIG. 12 and will therefore not be described again here.

At the step 106, the next executed step number is taken from the next executed step number A3 of the process sequence operation table 31A and stored into the table 32, and the processing advances to step 107. If the condition has not been enabled at the step 105, the processing also moves on to the step 107. At the step 107, the stop signal detector 5 is called and checked for the presence or absence of the stop signal, i.e., checked for the presence or absence of an error. If the error exists, error processing described below is carried out. When the processing at step 107 is complete, the execution returns to step 102 and repeats the processing from step 102 onward.

The processing at the step 107 will now be described in further detail in accordance with the flowchart illustrated in FIG. 5. When the stop signal detector 5 is activated at step 110 in the flowchart shown in FIG. 5, a signal preassigned as the stop signal among the input signals 7 from the controlled object is checked at step 111 to see if it is on or not (off). If it is not on, the execution goes to step 113 and returns to step 102. If the stop signal is on, the execution advances to step 112 and the stop-time execution operation section 6 is called and performs error processing which will be described later. The execution then progresses to the step 113 and returns to step 102.

The details of the error processing at the step 112 will now be described with reference to the flowchart shown in FIG. 6. When the stop-time execution operation section 6 is activated at step 120 in the flowchart illustrated in FIG. 6, the currently executed step number is obtained from the currently executed step number storage table 32 at step 121. Then, at step 122, a line on which the stop-time step number E1 matches the currently executed step number is retrieved in the stop-time execution operation table 35, and at step 123, the step number in the stop-time execution step number E2 of the table 35 is stored into the table 32 as the currently executed step number.

Then, at step 124, the program at the operation step corresponding to the currently executed step number stored in the table 32 is read and executed from the step operation program table 33. Then, at step 125, it is checked to see if the signal preassigned as the stop signal has turned off or not. If it is not off, the execution goes to step 126, where it is judged whether or not the next executed step number exists in the stop-time execution step number E2 in the table 35. If it exists, the next executed step number is stored into the table 32 at step 127. The execution then returns to the step 124 and repeats the processing from the step 124 onward.

If it has been determined that the signal is off at the step 125, the execution advances to step 128, where the resumption-time execution step number E3 is checked in the table 35, the corresponding step number is stored into the table 32 as the currently executed step number, and the execution moves on to step 129 and returns to the appropriate processing point.

Next, details are described with reference to the SFC program shown in FIG. 2. The operation is the same as that shown in FIG. 8 when either the transition condition T1 or T2 in FIG. 2 is enabled. However, if an error occurs at Step S1 and neither the transition condition T1 nor T2 is enabled, that is, when LS3 58 is turned ON by the clamper 53 because the workpiece has not been set, or when L1 59 or L2 60 has been turned OFF because either the workpiece A 51 or B 52 is positioned incorrectly or when none of the limit switches LS1 56, LS2 57 and LS3 58 has been turned ON after a predetermined length of time because of a fault stemming from the clamper 53 itself or so on, it should be preassigned (i.e., the sequence controller should be programmed) so that a stop signal will be turned ON at step S1.

When the stop signal is turned ON at step S1, a step to be executed during the stop time is selected from the stop-time operation execution table 35. Since the step number to be executed during the stop-time which corresponds to step number 1 (S1) in stop-time operation execution table 35 is step number 4, the program OUT Y11 (workpiece unclamp) which corresponds to step number 4 in the step operation program table 33 is executed. It should be preassigned (i.e., the sequence controller should be programmed) so that the stop signal will be turned OFF when PB 61 for restart is turned ON. Therefore, for example, when an operator makes a correction, for example, so that a workpiece in an incorrect position is set in a right position, and the operator then pushes PB 61, the stop signal will be turned OFF, and execution of the processing will be resumed. The processing will start with step number 1 (step S1), to be executed at a resumption time which corresponds to step number 1 (S1) during the stop-time in the stop-time operation execution table 35.

In the described embodiment, when the SFC program is written as a sequence program for sequence-controlling a controlled object, the program for error processing at the occurrence of a fault or the like is written separately from the sequence program, the stop-time execution operation table 35 is written separately for error processing, the presence or absence of an error is checked on the basis of a change in the predetermined input signal per operation step execution, the sequence control processing is stopped if the error exists, and the operation step having the stop-time execution step number corresponding to the stop-time operation step in the table 35 is executed. After the execution returns to normal on completion of the error processing, the sequence is resumed from the operation step having the resumption-time execution step number.

Namely, according to the invention, it is not necessary to describe an error processing program in the sequence control processing sequence program, the normal and error processing programs do not mingle, and the programs are easy to write, review and revise. Further, since error processing can be carried out by only specifying a step number, the error processing program can be written extremely easily.

Although, in the first embodiment, an example concerning error processing during sequence control processing is given, the present invention is not limited to error processing during sequence control processing and a similar effect will be achieved when a manual operation 6 is introduced during an automatic operation. For example, when various types of special (temporary) manual operations need to be introduced during ordinary automatic operation (after the automatic operation comes to a stop) instead of writing a manual operation program into an automatic operation sequence program, by separately writing and executing a stop-time operation execution table, various temporary manual operation programs need not be written into the ordinary automatic operation program.

It will be apparent that the embodiments of the invention, as described above, achieve a sequence controller and a sequence control method therefore, the sequence controller being provided with a stop-time operation execution table, which stores stop-time execution step numbers and resumption-time execution step numbers corresponding to step numbers at which a stop is expected to occur in a sequence control program for sequence-controlling a controlled object, so that the execution of the sequence control program is stopped at the occurrence of an error, the stop-time execution step number corresponding to the stop-time step number is read from the stop-time operation execution table, a step having the step number read is executed, and further the resumption-time execution step number is read and the execution is resumed from that step, whereby error processing can be performed by specifying only a step number, the error processing need not be described in the program, and programs can be described easily.

What is claimed is:

1. A sequence control system comprising:

a sequence controller for sequence-controlling a controlled object based upon a main sequence control program;

a stop-time operation execution table storing step numbers of steps in said main sequence control program to be executed at a stop time and step numbers of steps in said main sequence control program to be executed at a resumption time, wherein said step numbers for said stop time and said step numbers for said resumption time correspond to step numbers at which a stop is expected to occur in said main sequence control program for controlling the controlled object;

an input signal change detector for detecting a change in an input signal in each process; and a stop-time operation executer for stopping the sequence control when a change in the input signal is detected, for reading a step number to be executed at said stop time corresponding to a step number at which a stop has occurred from the stop-time operation execution table, for executing a step having the step number read, for reading a step number to be executed at said resumption time, and for resuming execution when the input signal is restored to an original state.

2. A sequence controlling method for a sequence controller for executing a sequence control program and sequence-controlling a controlled object according to a process sequence, said method comprising the steps of:

pre-storing step numbers of steps in said sequence control program to be executed at a stop time and step numbers of steps in said sequence control program to be executed at a resumption time in a stop-time operation execution table, wherein said steps for said stop time and said steps for said resumption time correspond to step numbers at which a stop is expected to occur in the sequence control program;

detecting a change in an input signal in each process of the sequence control program of the controlled object;

stopping sequence control when a change in the input signal is detected;

reading a step number to be executed at said stop time corresponding to a step number at which said stop has occurred from the stop-time operation execution table and executing a step having the step number read; and reading a step number to be executed at a resumption time and resuming the execution of the sequence control program when the input signal change is restored to an original state.

* * * * *